(12) United States Patent
Vouche (10) Patent No.: US 6,247,682 B1
(45) Date of Patent: Jun. 19, 2001

(54) PLUME ABATED COOLING TOWER

(75) Inventor: Michel Vouche, Brussels (BE)

(73) Assignee: Hamon Thermal Europe S.A., Brussels (BE)

(*) Notice: Subject to any disclaimer, the term of this patent is extended or adjusted under 35 U.S.C. 154(b) by 0 days.

(21) Appl. No.: 09/306,736

(22) Filed: May 7, 1999

(51) Int. Cl.⁷ ...................................................... B01F 3/04
(52) U.S. Cl. .......................... 261/152; 261/153; 261/157; 261/161; 261/DIG. 77; 165/900
(58) Field of Search ................... 261/152, 153, 261/157, 158, 159, 160, 161, DIG. 77; 165/112, 900

(56) References Cited

U.S. PATENT DOCUMENTS

| | | | |
|---|---|---|---|
| 3,997,635 | * 12/1976 | Hallgren | 261/DIG. 77 |
| 4,337,216 | * 6/1982 | Korsell | 261/DIG. 77 |
| 4,544,513 | * 10/1985 | Otterbein | 261/159 |
| 4,623,494 | * 11/1986 | Gautier et al. | 261/158 |
| 5,724,828 | * 3/1998 | Korenic | 261/160 |
| 5,800,743 | 9/1998 | Usui et al. | |

FOREIGN PATENT DOCUMENTS

| | | | |
|---|---|---|---|
| 0 151 547 | 8/1985 | (EP) . | |
| 0 237 486 | 9/1987 | (EP) . | |
| 2 081 863 | 2/1982 | (GB) . | |
| 61-175480 | * 8/1986 | (JP) | 261/DIG. 77 |

OTHER PUBLICATIONS

Lindahl, Jr., Paul A., Jameson, Randall W., Plume Abatement and Water Conservation with the Wet/Dry Cooling Tower, Cooling Tower Inst., Technical Paper No. TP93–01 (1993).

* cited by examiner

Primary Examiner—C. Scott Bushey
(74) Attorney, Agent, or Firm—Hoffmann & Baron, LLP (57) ABSTRACT

The plume abated cooling tower having a heat exchanger in which an aqueous fluid is cooled by an air flow. The heat exchanger has first channels in which air and fluid counterflow, second channels in which air flows, and a means for avoiding the passage of fluid into said second channels, said second channels having a heat conductive surface contacting a plurality of first channels.

9 Claims, 7 Drawing Sheets

PLUME ABATED COOLING TOWER

THE PRIOR ART

Air cooling towers have been widely used, for example for cooling the water used in a condensation unit of an electrical power plant.

Wet cooling towers are towers comprising a heat exchanger on which water is distributed and in which air and the water counterflow. The air escaping the heat exchanger and the tower is charged in water and forms a visible plume, which is an esthetical pollution. In certain instances, the formation of plume has even to be completely avoided for example when the cooling tower is located near a road or in a city.

In order to solve the problem of plume, various wet-dry type cooling towers have been proposed.

Said wet-dry cooling towers comprises two distinct heat exchangers, namely a first indirect contact heat exchanger for the dry heating of a first air flow, said first heat exchanger having fin tubes in which the water coming from the condensation unit flows, before being sprayed onto a second direct contact heat exchanger having channels in which air and water counterflow so as to form a wet heated air flow. The said first air flow and the wet air flow are then mixed together so as to reduce the formation of plume. The plume abatement by means of wet/dry cooling tower is for example disclosed in the "Technical Paper Number TP93-01" of the Cooling Tower Institute 1993 Annual Meeting, "Plume abatement and Water Conservation with the wet/dry cooling tower" by Paul A. Lindahl et al, the content of said paper being incorporated to this specification by reference.

Such known wet-dry cooling towers have many drawbacks, the major of which are the construction of an expensive specific heat exchanger for the dry heating of air, and the consumption of energy for compensating the pressure loss of the water when flowing through the fin tubes of the first heat exchanger. It means that the investments and the operating costs for such known wet-dry cooling tower are high, whereby industrials are reluctant to use such wet-dry cooling towers.

The present invention relates to a cooling tower that obviates these drawbacks. The cooling tower of the invention does not require the high investments and operating costs required by the dry-wet tower of the state of the art, as the cooling tower has a heat exchanger on which the water to be cooled is distributed and through which said water flows, said heat exchanger being adapted for the dry heating of a first air flow and for the wet heating of a second air flow.

BRIEF DESCRIPTION OF THE INVENTION

The invention relates to a plume abated cooling tower for cooling an aqueous fluid by means of air, said tower comprising:

(a) at least one air inlet;
(b) an air outlet;
(c) an air-aqueous fluid heat exchanger;
(d) at least one means for ensuring an air flow between the air inlet and the air outlet, as well as through the heat exchanger;
(e) a distribution system for distributing the fluid to be cooled on the heat exchanger, wherein the heat exchanger has first channels in which air and the fluid to be cooled counterflow, second channels in which air flows, and a means for avoiding the passage of the fluid to be cooled into the said second channels, said second channels having a heat conductive surface contacting a plurality of first channels.

Advantageously, said tower further comprises a drift eliminator for reducing the water loss by drift due to the air flow, said drift eliminator being located above the water distribution system, in which the means for avoiding the passage of the fluid to be cooled into the said second channels conveys the air escaping from the second channels at least upto a level in the tower located in the vicinity of the drift eliminator, preferably at least to a level in the tower upper the drift eliminator.

According to a preferred embodiment of the tower according to the invention, the first channels are adapted for ensuring a substantially vertical air-fluid counterflow, while the second channels are adapted for ensuring a substantially horizontal air flow.

According to a detail of an embodiment of the invention, the heat exchanger comprises heat exchanger packs with second channels, each pack comprising a plurality of second channels and a plurality of first channels. By using such packs, the construction of the heat exchanger of the tower of the invention is simple and not expensive. For example, a pack is made of several heat conductive plates linked the one to another by fins and/or by substantially perpendicular plates (linking plates substantially perpendicular to the heat conductive plates), preferably heat conductive fins and/or plates, so that between at least a first couple of adjacent plates, the fins define a series of second channels, while between at least another couple of adjacent plates, the fins and/or substantially perpendicular plates define a series of first channels.

In order to reach the highest temperature for the air flowing through the second channels, the said second channels preferably form a part of the heat exchanger adjacent to the said upper face onto the water is distributed or sprayed.

The tower may have one or more air inlets, for example distinct air inlets for the air flowing into the first channels and for the air flowing into the second channels. The tower may also have one or several air inlets and means for guiding part of the air towards the second channels.

Preferably, the cooling tower is provided with a drift eliminator and at least one wall defining an inner chamber in which the heat exchanger and the drift eliminator are located. In said embodiments, the means for avoiding the passage of the fluid to be cooled into the said second channels advantageously conveys the air escaping from the second channels (or at least a part of said air) at least at a distance from the said at least one wall defining the said chamber and/or at least part of the air escaping from the second channels at least substantially along the central axis of the chamber.

In the tower of the invention, the means for ensuring an air flow between the air inlet and the air outlet, as well as through the heat exchanger, is for example, a fan sucking air through the heat exchanger, a plurality of fans sucking air through the heat exchanger, a fan pushing air through the heat exchanger, a plurality of fans pushing air through the heat exchanger, a form of the tower adapted for a natural draft of air through the heat exchanger, or a combination thereof.

The invention relates also to a process for abating plume produced from a cooling tower. In said process, an aqueous fluid is cooled by means of an air flow having an initial relative humidity, the said aqueous fluid being distributed on a heat exchanger having first channels in which air and the fluid counterflow, and second channels in which air flows without counterflow of fluid, said second channels having a heat conductive surface contacting a plurality of first channels whereby heat is transferred from the fluid and air flowing through first channels towards the air flowing in second channels. The air passing through the exchanger is heated and comprises at least one air flow with a relative humidity of at least 99% and at least one air flow with a relative humidity lower than the initial relative humidity of the air. Thereafter, at least one air flow with a relative humidity of at least 99% and at least one air flow with a relative humidity lower than the initial relative humidity of the air are mixed together.

Advantageously, the air flow with a relative humidity of at least 99% passes through a drift eliminator for eliminating from said air flow drifted water droplets.

For example, the air flow with a relative humidity of at least 99% and the air flow with a relative humidity lower than the initial relative humidity of the ambient air are mixed together in a volume ratio air flow with a relative humidity of at least 99%/air flow with a relative humidity lower than the initial relative humidity of the air advantageously comprised between 5:1 and 1:1. The said ratio is advantageously adapted or controlled so that when exhausting into the atmosphere the air passing through the heat exchanger, the said air has a temperature and a relative humidity such that when mixed with atmospheric air, substantially no plume is formed.

Details and characteristics of preferred embodiments of towers according to the invention, given as examples only, will appear from the following description in which reference is made to the attached drawings.

DESCRIPTION OF PREFERRED EMBODIMENTS

In order to better see the difference and the improvement of a tower according to the invention with respect to a known wet/dry tower, a brief description of a known wet/dry cooling tower will be given hereafter with reference to FIG. 1.

Figure 1:
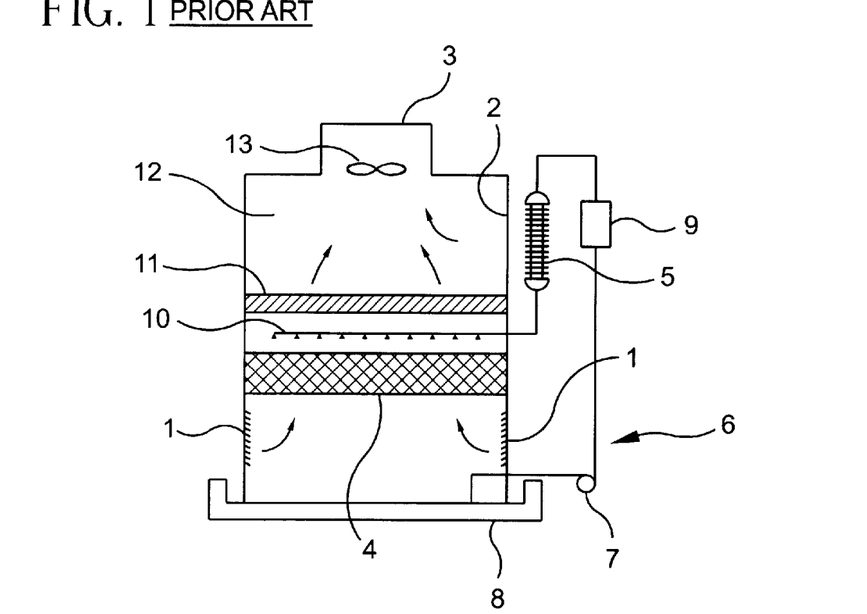
FIG. 1 is a schematic view in cross section of a wet/dry tower of the state of the art.

The wet/dry cooling tower of FIG. 1 comprises:

a first air inlet 1 at the bottom of the tower;

a second air inlet 2 in the upper part of the tower;

an air outlet 3;

a fan 13 mounted in the exhaust pipe 3 in order to create by suction air flows between the inlets 1 and 2 and the outlet 3;

a heat exchanger 4 with direct counterflow contact between air and the water to be cooled, said exchanger being located between the inlet 1 and the outlet 3;

an indirect contact heat exchanger 5 with tubes in which water flows, said heat exchanger being mounted in the neighborhood of the inlet 2;

a water flow circuit 6 comprising a pump 7 pumping water from a collecting basin 8 and conveying said water successively in a condensation unit or a process heat exchanger 9 in which water is heated, in the heat exchanger 5 and in a piping system provided with sprayers 10 spraying water onto the heat exchanger 4, the said water after flowing through the said exchanger 4 falling into the collecting basin 8, while air passing through the exchanger 4 in counterflow with respect to the water flow is wetted and even drifts water droplets;

a drift eliminator 11 located between the sprayers 10 and the exhaust 3; and a chamber 12 located between the drift eliminator 11 and the exhaust 3, the said chamber receiving the air wetted in the exchanger 4 after its passage through the drift eliminator 11 and the air heated by the heat exchanger 5, the said wetted air flow and dry air flow being mixed together in said chamber.

As the water to be cooled has to flow first in the heat exchanger before being sprayed, the pump 7 has to compensate the pressure loss due to the water flow through the tubes of the exchanger 5. Moreover, as the water to be sprayed has already been cooled in the exchanger 5, the maximum temperature of the wetted air is lower than the maximum temperature of the wetted air of a conventional wet cooling tower (tower without heat exchanger 5).

Figure 2:
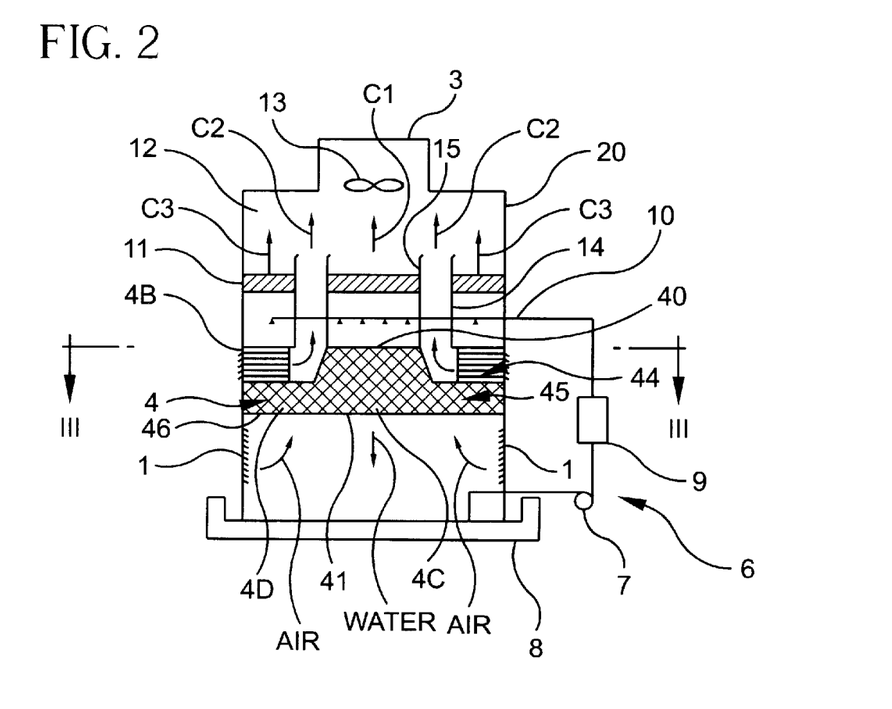
FIG. 2 is a schematic view in cross section of a tower according to the invention.
Figure 3:
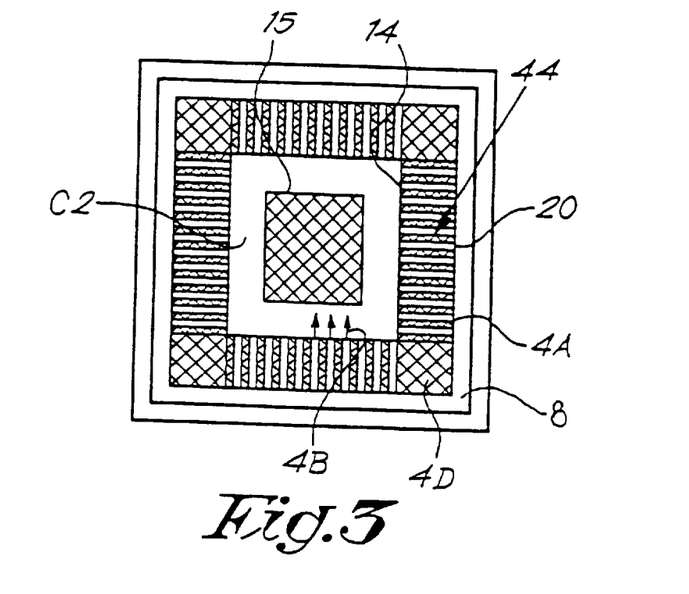
FIG. 3 is a cross section view along the line III—III of the tower of FIG. 2.

The tower of FIG. 2 is similar to the tower of FIG. 1, except that there is no heat exchanger 5, and that the heat exchanger 4 has first channels 4A in which air and water counterflow, second channels 4B in which air flows, and a means 14,15 for avoiding the passage of water into said second channels 4B, said second channels 4B having a heat conductive surface contacting a plurality of first channels 4A.

The means or walls 14,15 act in the preferred embodiment shown, as a means for collecting the air heated in the channels 4B and for conveying the said heated air upto a level higher than the level of the sprayers 10, advantageously at least in the vicinity of the drift eliminator 11, preferably up to a level higher than the drift eliminator 11. As shown in the figures, the walls 14,15 form a distribution system of dry heated air (C2) between two wet air flows (C1,C3).

The heat exchanger 4 comprises different parts, namely parts 44 comprising packings provided with channels 4A and channels 4B and part 45 provided with packing for a direct counterflow air-water contact. The parts 44 are located in the vicinity of the upper surface 40 of the exchanger 4, on which the water to be cooled is distributed. Packing 45 is also provided under the parts 44, whereby the water flowing downwards in the channels 4A flows thereafter in the packing 45 where said water is in direct contact with an upwards air flow.

The air exhausting from the exchanger 4 comprises three different air flows C1,C2,C3, which are mixed together in the chamber 12 at a distance from the drift eliminator 11.

The air flow C1 is the air flow escaping from the central part of the exchanger 4C, said air being an air which has been wetted when flowing in packing 45 (with direct contact counterflow with water). Said air flow has for example a temperature of 30° C. and is equivalent to a wet air flow obtained in a conventional wet cooling tower.

The air flow C2 has a relative humidity lower than the initial relative humidity of the air. The temperature of the air flow C2 is for example equal or lower to the temperature of the air flow C1. Advantageously the temperature of the air flow C2 is 3 to 8° C. lower than the temperature of the air flow C1.

The air flow C3 is a wet air flow, as the air passes first through a part 46 comprising packing 45 (i.e. in direct contact counterflow with water) and then through the channels 4A of the parts 44 (i.e. in direct contact counterflow with water). The temperature of the air flow C3 is advantageously 3 to 8° C. higher than the temperature of the air flow C2.

Figure 4:
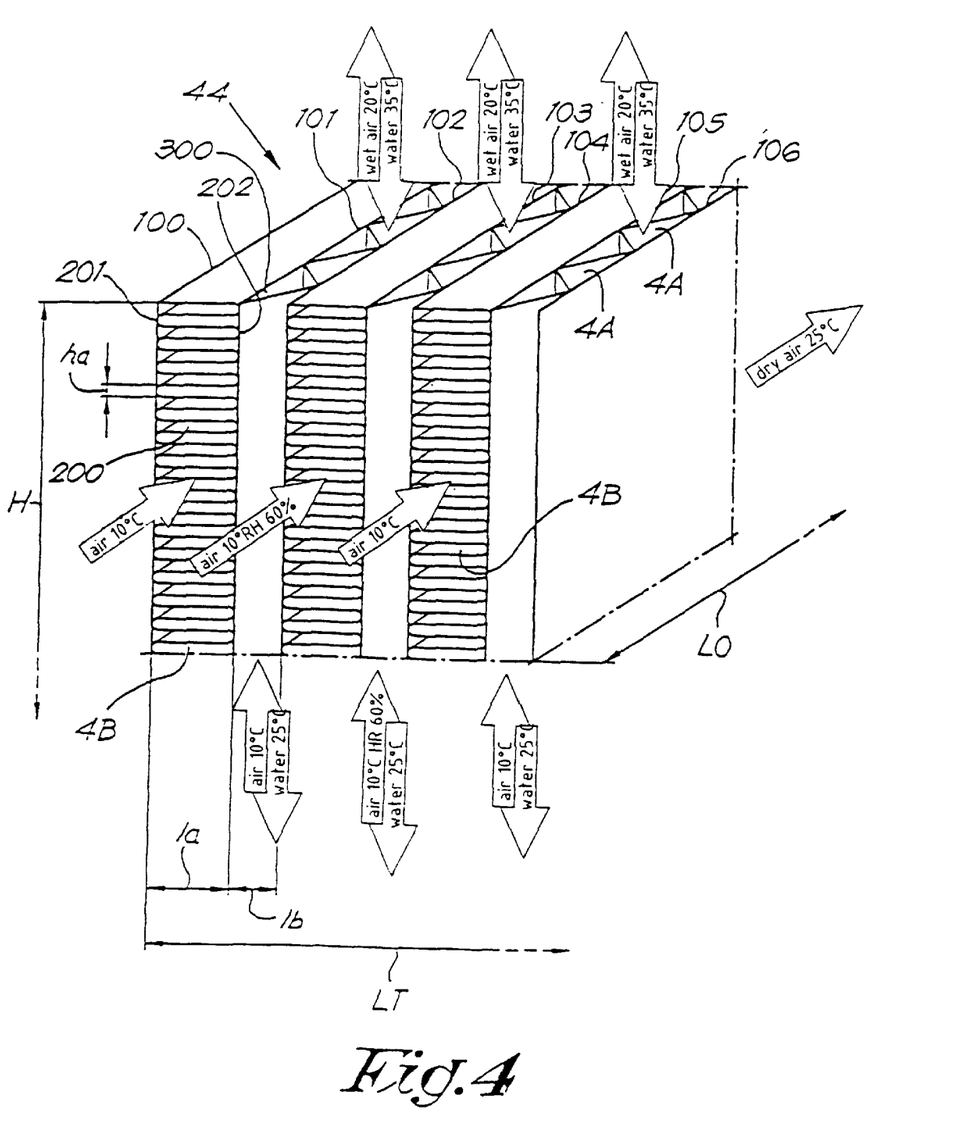
FIG. 4 is a partial view in perspective of a first embodiment of a pack suitable for the heat exchanger of the tower of FIG. 2.

A partial view of a pack of the part 44 is shown in FIG. 4. The pack comprises a plurality of substantially vertical plates 100,101,102,103,104,105 made of a heat conductive material (such as in aluminum, copper, etc.) linked the one to the other by means of elements 200,300 forming fins extending between two adjacent plates. The element 200 is for example a plate that has been bent so as to form fins that are substantially perpendicular to the plates and so as to form for example from 100 to 1000 (advantageously from 250 to 500) channels 4B per meter. The element 300 is for example a plate that has been bent so as to form a succession of zigzag. The end parts 201,202 and 301,302 respectively of the elements 200 and 300 are welded, brazed, soldered or glued to the plates so as to ensure a good heat conductivity.

The channels 4B have a width "la" for example comprised between 10 and 50 mm, preferably between 15 and 30 mm, and a height "ha" for example comprised between 1 and 10 mm, advantageously between 2 and 6 mm, preferably from 3 to 4 mm.

The distance "lb" separating two adjacent plates between which channels 4A are formed is greater than 10 mm, advantageously comprised between 15 and 80 mm, preferably comprised between 20 and 60 mm.

In the channels 4A, a direct counterflow contact between air and water exists. When the water flows downwards in the channels 4A, the plates 102,103,104,105, etc. are heated, whereby heat is transferred by heat conduction to the fins of the elements 200. The air flowing in the channels 4B contacts the fins of the elements 200, whereby the said air is heated.

The pack is for example formed by a plurality of plates having a length (LO) of 2 m and a height (H) of 1 m, said plates being linked the one to the other by elements 200 and 300 so as to obtain a total width (LT) from 20 to 50 cm.

The tower of FIG. 2 has been used for cooling water having a temperature of 35° C. by means of air having an initial temperature of 10° C. and an initial relative humidity (HR or RH in the drawings) of 60%. The said hot water has been distributed on the upper surface of the exchanger 4. The air (C1) after flowing through the central part of the exchanger was wetted and had a temperature of 30° C., the air (C2) after flowing through the channels 4B had a temperature of about 25° C. and a relative humidity of about 20%, while the air after flowing through the part 46 was wetted and had a temperature of about 20° C. and the air after flowing through the part 46 and the part (channels 4A) 44 was wetted and had a temperature of about 30° C.

The air flow rate in the channels 4B is for example comprised between 25 and 50 m$^3$/hour, while the air flow rate of C1 and C3 was respectively comprised between 25 and 100 m$^3$/hour and between 25 and 50 m$^3$/hour. Advantageously, the air flow rates are adjusted or controlled so that when the air is exhausted into the atmosphere and mixed with the atmospheric air, at least substantially no plume is visible.

Figure 5:
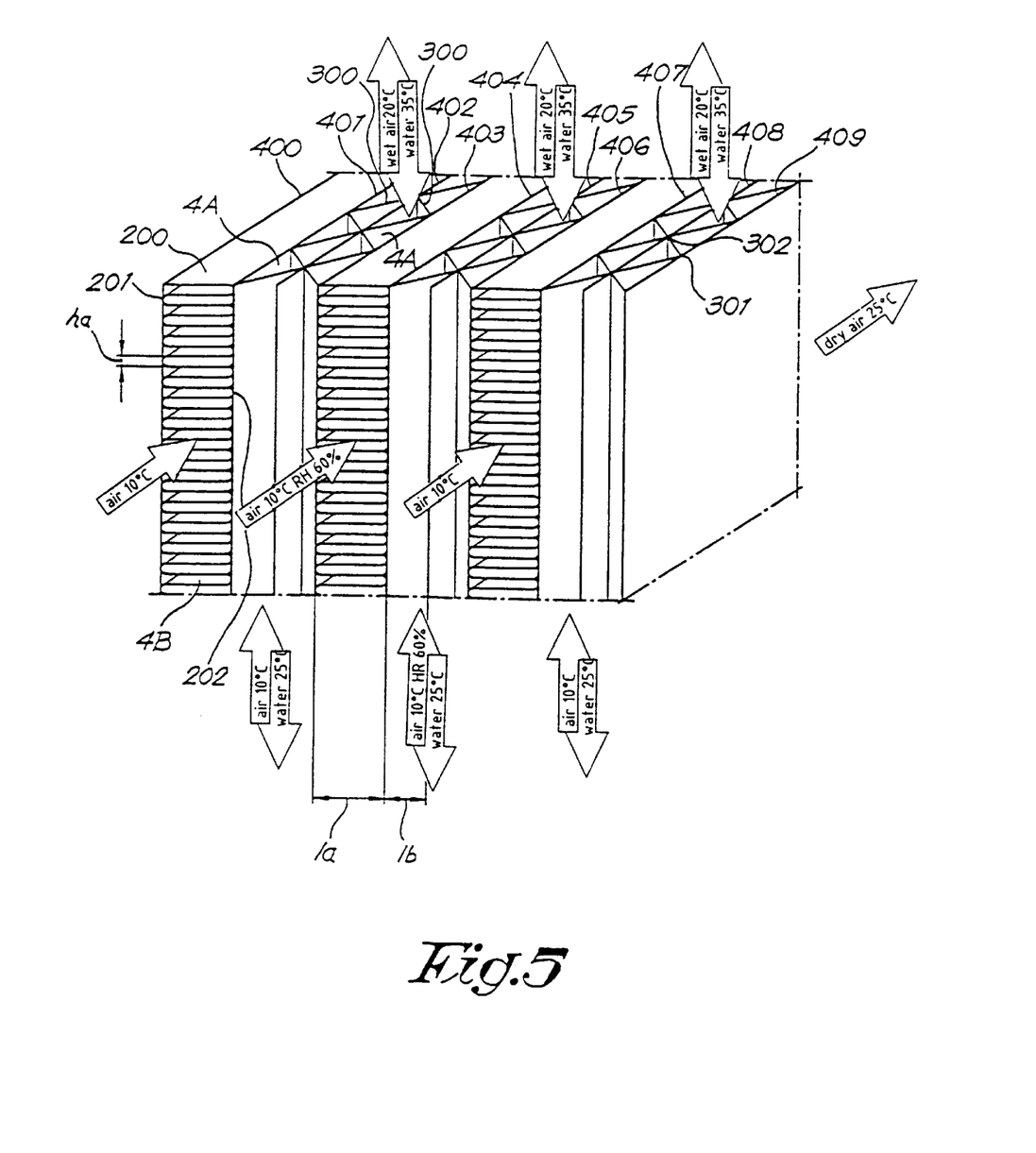
FIGS. 5 and 6 are views similar to FIG. 4, but for other embodiments of a pack.

FIG. 5 is a view of a pack similar to that shown in FIG. 4. Said pack comprises vertical plates 400,401,402,403,404, 405,406,407,408,409 linked the one to another by fins 200 or fins 300. The difference between the pack of FIG. 4 and the pack of FIG. 5 is that the distance between the channels 4B defined between the plates 403 and 404, and the channels 4B defined between the plates 406,407 is substantially twice the distance separating the plates 101 and 102.

Figure 6:
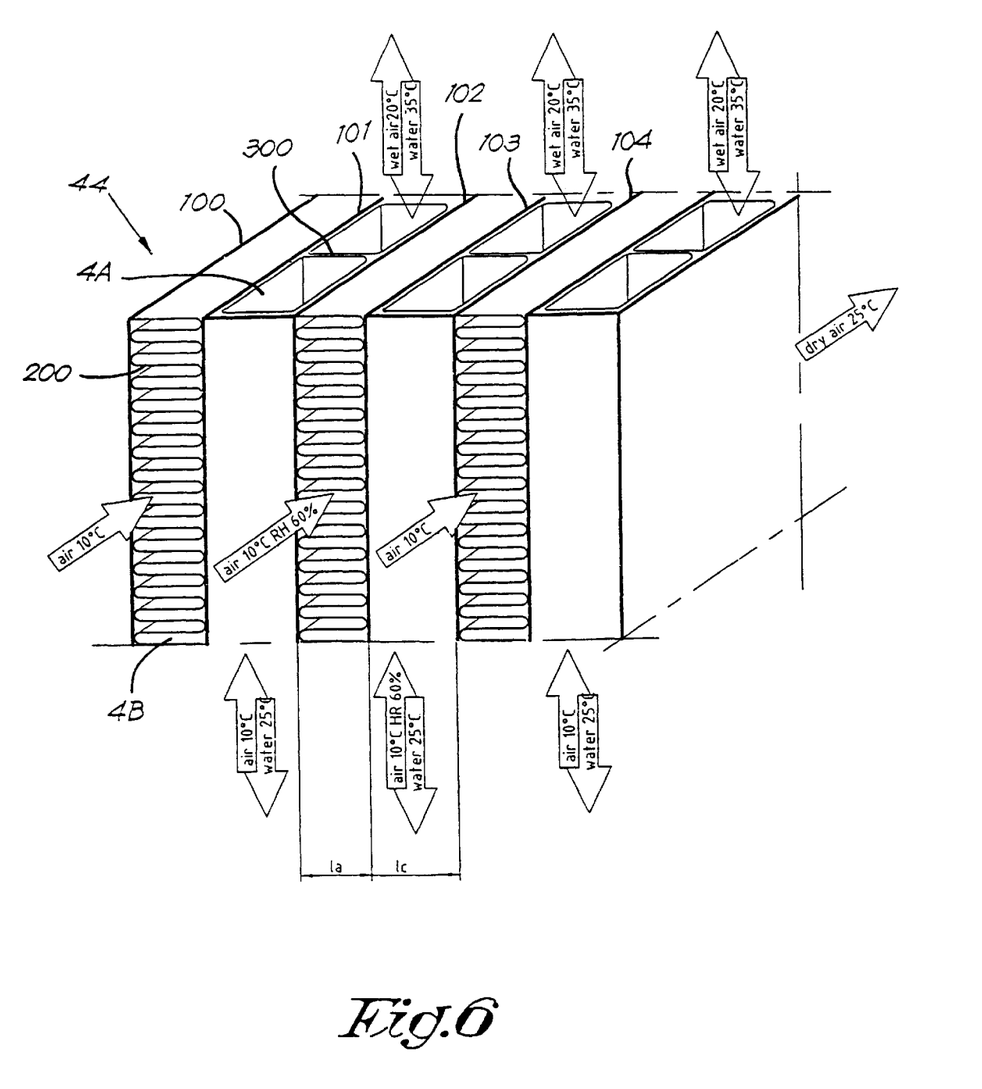

FIG. 6 is another view of a pack similar to that shown in FIG. 4, except that the channels 4A have a substantially rectangular or square cross section and that the distance "lc" corresponds substantially to twice the width "la" of the channels 4B.

Figure 7:
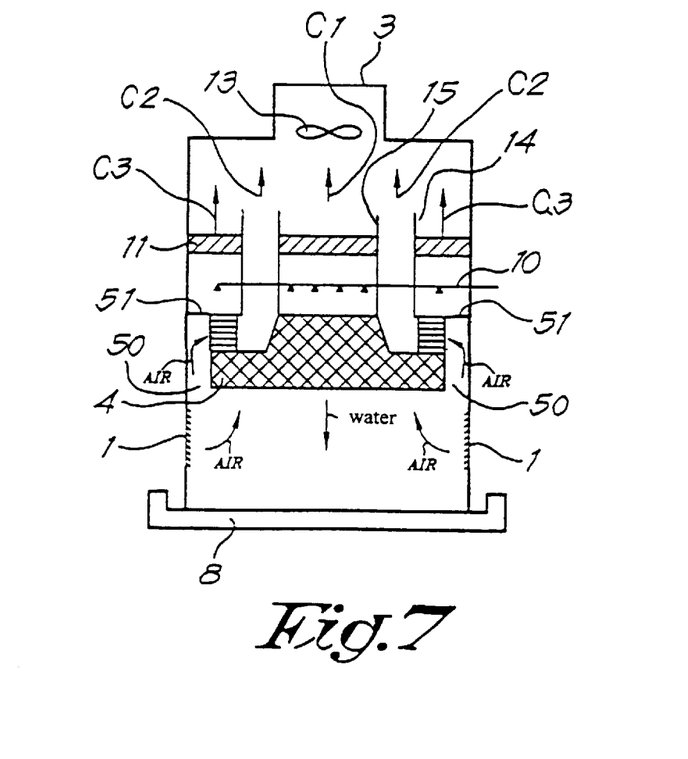
FIG. 7 is a schematic view in cross section of another tower according to the invention.

FIG. 7 is a view of a tower similar to the tower shown in FIG. 2, except that the tower has only air inlets 1 in the bottom of the tower and that a channel is created between the wall of the tower and the lateral side of the heat exchanger for forming a channel for conveying air towards the channels 4B.

Figure 8:
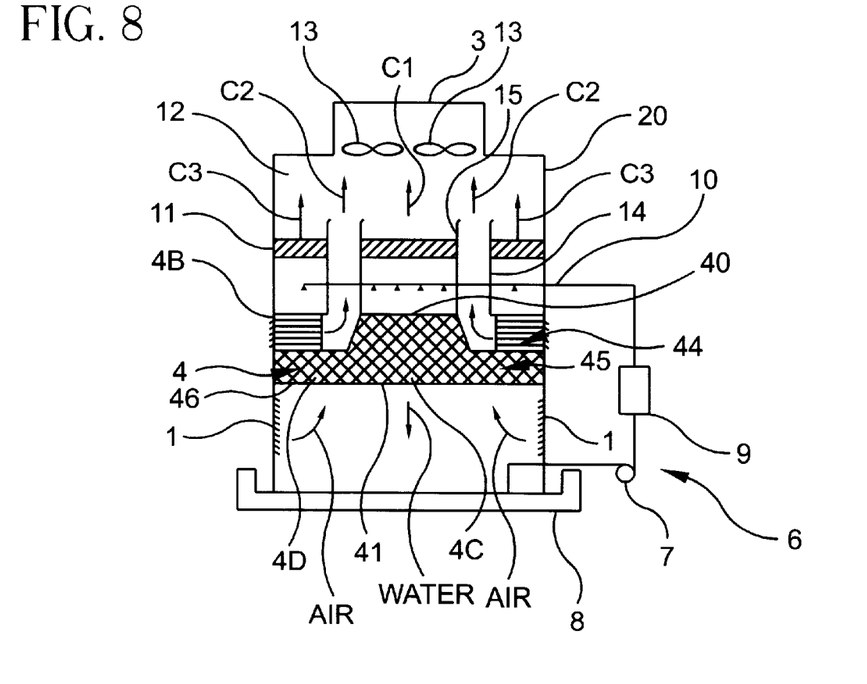
FIG. 8 is a schematic view in cross section of an alternative embodiment of the present invention.
Figure 9:
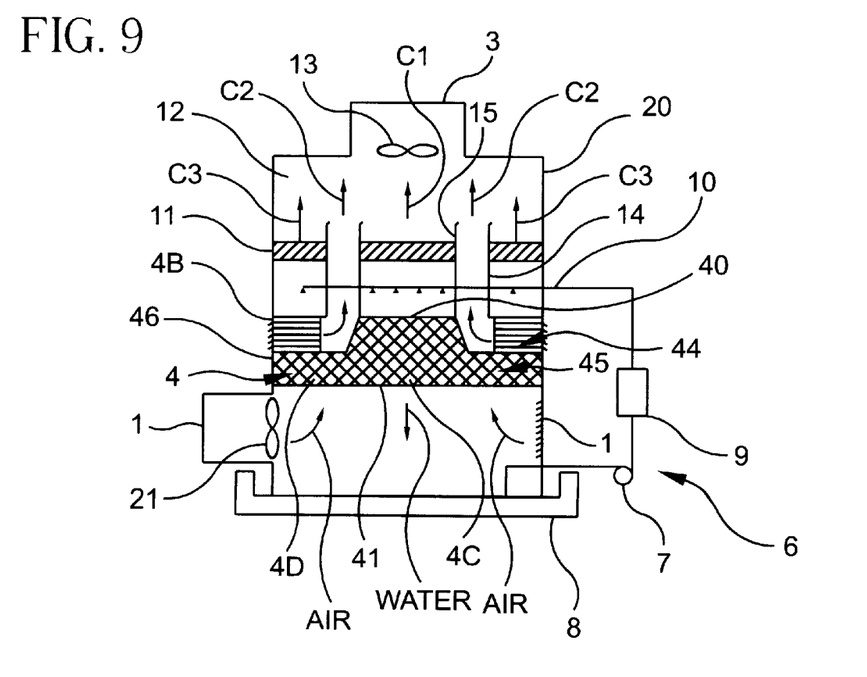
FIG. 9 is a schematic view in cross section of still another embodiment of the present invention.
Figure 10:
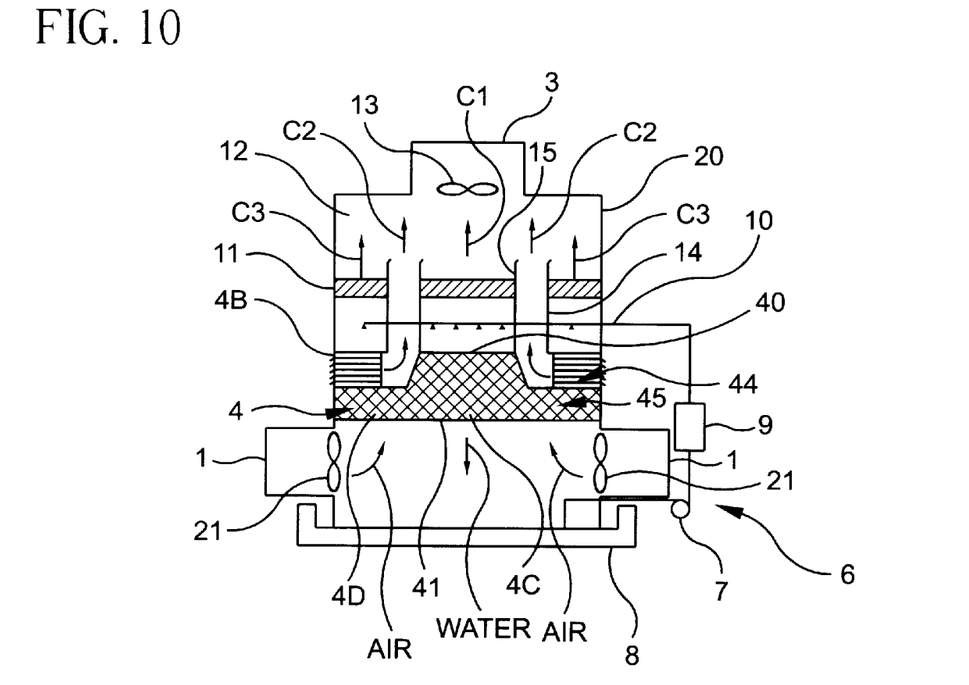
FIG. 10 is a schematic view in cross section of yet another alternative embodiment of the present invention a tower according to the invention.

An alternative embodiment of the present invention is shown in FIG. 8 which uses a plurality of fans 13 to create the air flows between inlets 1 and 2 and outlet 3. FIG. 9 shows how a fan 21 can be used to push air through the heat exchanger to create the air flow needed through the heat exchanger. Another alternative embodiment of the present invention as shown in FIG. 10 exhibits how a plurality of fans 21 can be used to push air through the heat exchanger to create the necessary air flows.

The towers shown in the drawings have several advantages, among which the followings:

low investment cost;

low operating cost (operating cost similar to the operating cost of a conventional wet cooling tower);

simple and easy building;

the heat exchanger has a low weight;

easy maintenance;

possibility to transform with small adaptations a wet conventional cooling tower into a wet/dry cooling tower of the invention;

substantially no formation of significant visible plume, etc.

It is clear that many modifications of the towers according to the invention which are shown in the figures are possible.

For example, the air flow C2 (dry heated air) or a part thereof can be exhausted from the exchanger substantially along the central axis of the tower and/or the parts 44 with channels 4B can make a separation between distinct sections of the upper face of the exchanger for which only a direct contact counterflow air-water exists.

It is possible to provide the tower with control system for controlling (a) the opening of the inlet(s) 1 or 2 and/or (b) the working of the fan so as to control the flow rate and/or (c) the temperature and/or relative humidity of the wet air flow and/or of the dry air flow.

Instead of having a fan for drawing the air through the exchanger, it is possible to use other means so as to ensure a passage of air through the exchanger. Such means is for example a fan pushing air through the exchanger or a shape and height of the tower adapted for ensuring a natural drawing of air through the heat exchanger.

What I claim is:

1. Plume abated cooling tower for cooling an aqueous fluid by means of air, said tower comprising:

a) at least one air inlet;

b) an air outlet;

c) an air-aqueous fluid heat exchanger;

d) at least one means for ensuring an airflow between the air inlet and the air outlet, as well as through the heat exchanger;

e) a distribution system for distributing the fluid to be cooled on the heat exchanger, and f) a drift eliminator located above the distribution system, said drift eliminator reducing the water loss by drift due to the airflow;

wherein the heat exchanger has first vertical channels in which air and the fluid to be cooled counterflow, second horizontal channels in which airflows, and a means for avoiding the passage of the fluid to be cooled into said second channels, said second channels having a heat conductive surface contacting a plurality of first channels, wherein the heat exchanger comprises heat exchanger packs with second channels, each pack being made of several heat conductive plates linked the one to another by fins, so that between at least a first couple of adjacent plates the fins define a series of second channels, while between at least another couple of adjacent plates, the fins define a series of first channels, and wherein the cooling tower comprises means for collecting the air heated in the second channels and for conveying said air above the drift eliminator, said means acting as means for avoiding the passage of the fluid to be cooled into said second channels.

2. The tower of claim 1, in which the heat exchanger comprises heat exchanger packs with second channels and first channels, the pack comprising couples of adjacent heat conductive plates linked together by fins for forming a series of second horizontal channels, and couples of adjacent heat conductive plates linked together by substantially perpendicular plates for forming a series of first vertical channels.

3. The tower of claim 1, in which the heat exchanger has a upper face onto which the fluid to be cooled is distributed by the distribution system, said second channels forming a part of the heat exchanger adjacent to said upper face.

4. The tower of claim 1, in which the tower has a first air inlet for the air flowing into the first channels, and a second air inlet for the air flowing into the second channels.

5. The tower of claim 1, in which the tower has an air inlet for the air flowing in the first channels and in the second channels, the said tower being provided with a means for guiding part of the air towards the second channels.

6. The tower of claim 1, in which the means for ensuring an air flow between the air inlet and the air outlet, as well as through the heat exchanger, is selected from the group consisting of a fan sucking air through the heat exchanger, a plurality of fans sucking air through the heat exchanger, a fan pushing air through the heat exchanger, a plurality of fans pushing air through the heat exchanger, a form of the tower adapted for a natural draft of air through the heat exchanger, and a combination thereof.

7. The tower of claim 1 having a central axis, in which the means for collecting the air heated in the second channels and for conveying said air above the drift eliminator is substantially centered with said central axis.

8. A process for abating plume produced from a cooling tower in which an aqueous fluid is cooled by means of an airflow having an initial relative humidity, in which said aqueous fluid is distributed on a heat exchanger having first vertical channels in which air and the fluid counterflow, and second horizontal channels in which airflows without counterflow of the fluid, said second channels having a heat conductive surface contacting a plurality of first channels whereby heat is transferred from the fluid and airflowing through first channels towards the airflowing in second channels, so that the air passing through the exchanger is heated and comprises an airflow with a relative humidity of at least 99% and an airflow with a relative humidity lower than the initial relative humidity of the air, and in which the airflow with a relative humidity of at least 99% passes through a drift eliminator for eliminating from said airflow drifted water droplets and is then mixed with the airflow with a relative humidity lower than the initial relative humidity of the air.

9. The process of claim 8, in which the air flow with a relative humidity of at least 99% and the air flow with a relative humidity lower than the initial relative humidity of the air are mixed together in a volume ratio air flow with a relative humidity of at least 99%/air flow with a relative humidity lower than the initial relative humidity of the air comprised between 5:1 and 1:1.

* * * * *